(12) United States Patent
Takahashi

(10) Patent No.: US 11,991,422 B2
(45) Date of Patent: May 21, 2024

(54) ACOUSTIC DEVICE, DISPLAY CONTROL METHOD, AND DISPLAY CONTROL PROGRAM

(71) Applicant: AlphaTheta Corporation, Yokohama (JP)

(72) Inventor: Yasunori Takahashi, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 134 days.

(21) Appl. No.: 17/774,982

(22) PCT Filed: Nov. 8, 2019

(86) PCT No.: PCT/JP2019/043966
§ 371 (c)(1),
(2) Date: May 6, 2022

(87) PCT Pub. No.: WO2021/090495
PCT Pub. Date: May 14, 2021

(65) Prior Publication Data
US 2022/0394354 A1    Dec. 8, 2022

(51) Int. Cl.
*H04N 21/81*    (2011.01)
*H04N 21/422*   (2011.01)
*H04N 21/6587*  (2011.01)

(52) U.S. Cl.
CPC ... *H04N 21/8106* (2013.01); *H04N 21/42204* (2013.01); *H04N 21/6587* (2013.01)

(58) Field of Classification Search
CPC ......... H04N 21/8106; H04N 21/42204; H04N 21/6587; G10H 1/40; G10H 2210/241;
(Continued)

(56) References Cited

U.S. PATENT DOCUMENTS

2013/0194476 A1* 8/2013 Shimosato ............ G06F 3/0482
348/333.01
2016/0224310 A1* 8/2016 Wallner ............... G11B 27/105
(Continued)

FOREIGN PATENT DOCUMENTS

JP   2004-173137 A   6/2004
JP   2008-152308 A   7/2008
(Continued)

OTHER PUBLICATIONS

English translation of the International Preliminary Report on Patentability dated May 10, 2022, Application No. PCT/JP2019/043966, 6 pages.
(Continued)

*Primary Examiner* — Akelaw Teshale
(74) *Attorney, Agent, or Firm* — Rankin, Hill & Clark LLP

(57) ABSTRACT

An acoustic device includes: a first display unit; a second display unit; an operation unit configured to receive a user's operation; a judging unit configured to judge a type of the operation performed on the operation unit; and a display controller configured to, in response to the type of the operation determined by the judging unit, change display contents of the first display unit to display contents corresponding to the type of the operation and display on the second display unit at least a part of the display contents having been displayed on the first display unit.

14 Claims, 7 Drawing Sheets

(58) Field of Classification Search
CPC ....... G10H 2210/385; G10H 2220/086; G10G 1/00; G11B 27/34
See application file for complete search history.

(56) References Cited

U.S. PATENT DOCUMENTS

2016/0335041 A1* 11/2016 Wachter ................ H04R 27/00
2017/0277498 A1*  9/2017 Wood, Jr. .............. G06F 3/0481

FOREIGN PATENT DOCUMENTS

| JP | 2012-8214     |   | 1/2012 |
|----|---------------|---|--------|
| JP | 2015-79553    |   | 4/2015 |
| JP | 2015079553 A  | * | 4/2015 |
| JP | 2015-156084   |   | 8/2015 |
| WO | 2013/030863   |   | 3/2013 |
| WO | 2019/130596   |   | 7/2019 |

OTHER PUBLICATIONS

International Search Report dated Dec. 17, 2019, Application No. PCT/JP2019/043966, 5 pages.
Unknown, "DENON DJ Prime 4—User guide", (Jun. 20, 2019), pp. 1-37, XP093057279; English text.
Extended European Search Report dated Jul. 6, 2023 issued in corresponding European application No. 19951734.3 (English text); 23 pages.
Japanese Office Action dated Aug. 22, 2023, Application No. 2021-554550; English translation included, 6 pages.

* cited by examiner

ACOUSTIC DEVICE, DISPLAY CONTROL METHOD, AND DISPLAY CONTROL PROGRAM

TECHNICAL FIELD

The present invention relates to an acoustic device, a display control method, and a display control program.

BACKGROUND ART

Typically known acoustic devices include playback systems, playback control systems, and the like used by users such as DJ (Disc Jockey). An example of the acoustic devices is a DJ controller configured to display contents corresponding to an operation type on a display unit to support the operation by a user (see, for instance, Patent Literature 1).

For instance, Patent Literature 1 discloses a DJ controller including a rotary operator and a display unit provided on the rotary operator, where an image displayed on the display unit is controlled.

CITATION LIST

Patent Literature(s)

Patent Literature 1; WO 2019/130596 A

SUMMARY OF THE INVENTION

Problem(s) to be Solved by the Invention

According to recent increase in functionality of the acoustic devices, an amount of information to be displayed on the display unit is also increased. Meanwhile, DJ, who has preference in his/her own acoustic device and often carries and uses his/her own acoustic device, demands portability for the acoustic device. Accordingly, it is difficult to provide on the acoustic device a large-size display unit for displaying contents corresponding to each functionality.

An object of the invention is to solve at least a part of the above problem by, for instance, providing an acoustic device, a display control method, and a display control program capable of displaying, in addition to contents corresponding to an operation desired by a user, contents adapted for other operations.

Means for Solving the Problem(s)

An acoustic device according to a first aspect of the invention includes: a first display unit; a second display unit; an operation unit configured to receive a user's operation; a judging unit configured to judge a type of the operation on the operation unit; and a display controller configured to, in response to the type of the operation judged by the judging unit, change display contents of the first display unit to display contents corresponding to the type of the operation and display on the second display unit at least a part of the display contents having been displayed on the first display unit.

A display control method according to a second aspect of the invention is performed using an acoustic device including a first display unit, a second display unit, and an operation unit, the method including: judging a type of an operation on the operation unit; and in response to the judged type of the operation, changing display contents of the first display unit to display contents corresponding to the type of the operation and displaying on the second display unit at least a part of the display contents having been displayed on the first display unit.

A display control program according to a third aspect of the invention is performed using an acoustic device including a first display unit, a second display unit, and an operation unit, the program being configured to make the acoustic device perform: judging a type of an operation on the operation unit; and in response to the judged type of the operation, changing display contents of the first display unit to display contents corresponding to the type of the operation and displaying on the second display unit at least a part of the display contents having been displayed on the first display unit.

The acoustic device, display control method, and display control program according to the above aspects of the invention allow a display suitable for a user's operation.

BRIEF EXPLANATION OF DRAWING(S)

DESCRIPTION OF EMBODIMENT(S)

An exemplary embodiment of the invention will be described below.

Figure 1:
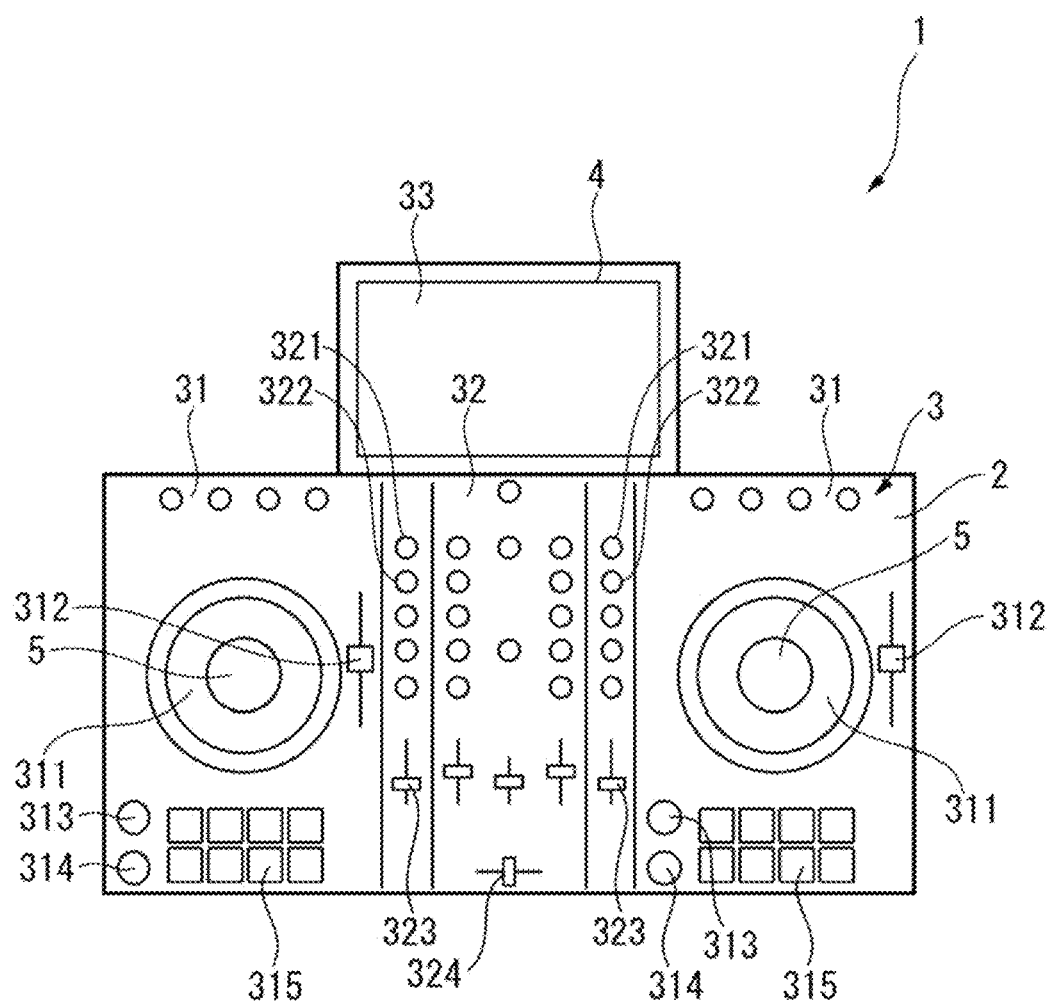
FIG. 1 is a schematic illustration showing an acoustic device according to an exemplary embodiment.

FIG. 1 is a schematic illustration showing an acoustic device 1 according to the present exemplary embodiment.

The acoustic device 1 according to the present exemplary embodiment is a DJ system including integrated media player and mixer, the media player being configured to play music data, the mixer being configured to control the media player. Specifically, the acoustic device 1, which serves as a sound playback device and a sound playback control device in response to an operation by a user, is configured to play music data and apply effects (e.g. phase distortion and noise) on currently played music data.

As shown in FIG. 1, the acoustic device 1 includes a casing 2, an operation unit 3, a main display unit 4 serving as a first display unit, and two sub display units 5 serving as a second display units and provided on the casing 2.

Structure of Operation Unit

The operation unit 3 is configured to receive the operation of the user. The operation unit 3 includes two decks 31 located on right and left sides of the casing 2, a mixer 32 located between the two decks 31 and at the center of the casing 2, and a touch panel 33.

Structure of Deck

The decks 31 each include a jog dial 311, a tempo slider 312, a cue button 313, a pause button 314, and a performance pad 315. Upon operation on the deck(s) 31 by a user, the acoustic device 1 plays the music data loaded in the corresponding deck(s) 31 and controls the playback state. Specifically, the acoustic device 1 plays the music data and applies various effects on the music data in response to the user's operation on the deck(s) 31.

The jog dial 11, which serves as a rotary operator, is a dial used in setting a playback direction and a playback speed of currently played music data. It should be noted that a so-called "scratching" peculiar to DJ performance is performed by a combination of user's operations for changing the direction and the speed of the rotary operation of the jog dial 311.

The tempo slider 312 is a lever for controlling the playback speed of the currently played music data. The playback speed of the currently played music is increased and decreased when the tempo slider 312 is slid upward and downward, respectively, from the center.

The cue button 313 is a button that is pressed down when a playback start position of the music data is set as a cue point.

The pause button 314 is a button that is pressed down when the currently played music data is started/stopped to be played.

The performance pad 315 is a versatile controller capable of being assigned with various functions relating to the playback control, Structure of Mixer The mixer 32 is configured to switch the music data, control the sound volume of each of channels, and applies sound effects in response to a user's operation.

The mixer 32 includes an effect selector knob 321, an effect volume adjuster knob 322, a channel fader 323, and a cross fader 324.

The effect selector knob 321 is a knob used for selecting an effect processing to be applied on the music data. Examples of the effect processing selectable by the effect selector knob 321 include chorus, echo, distortion, and noise.

The effect volume adjuster knob 322 is a variable-rotatable knob used for controlling the depth and magnitude of the effect processing applied on the music data.

The channel fader 323 is a lever used for controlling output sound volume level of each channel of the deck 31.

The cross fader 324 is a lever used for switching output sound volume levels of the music data outputted from the right and left decks 31.

Structure of Touch Panel

The touch panel 33 is provided to cover an image display area of the main display unit 4. The touch panel 33 is configured to detect the position touched by a user to output information (e.g. coordinates indicating the touch position) to a later-described controller 7 (see FIG. 2). It should be noted that various touch panels such as resistive film touch panel and electrostatic touch panel are usable for the touch panel 33.

Structure of Main Display Unit

The main display unit 4 is provided to the casing 2 in a manner adjacent to an upper side of the mixer 32. The main display unit 4, which is controlled by the later-described controller 7 (see FIG. 2), at least displays a playback screen including playback state information indicating the playback state of the music data, and a track selection screen of the music data.

Structure of Sub Display Unit

The sub display unit 5, which is provided, for instance, by a liquid crystal display device, is provided at the center of the jog dial 311. The sub display unit 5 is fixed to the casing 2 in a manner overlapped with the corresponding jog dial 311. Specifically, while the jog dial 311 is rotatably provided to the casing 2, the sub display unit 5 is provided to the casing 2 in a manner non-rotatable irrespective of the rotation of the corresponding jog dial 311.

Though detailed later, the sub display unit 5, which is controlled by the later-described controller 7 (see FIG. 2), displays at least a playback screen including playback state information indicating the playback state of the music data in the acoustic device 1.

Figure 2:
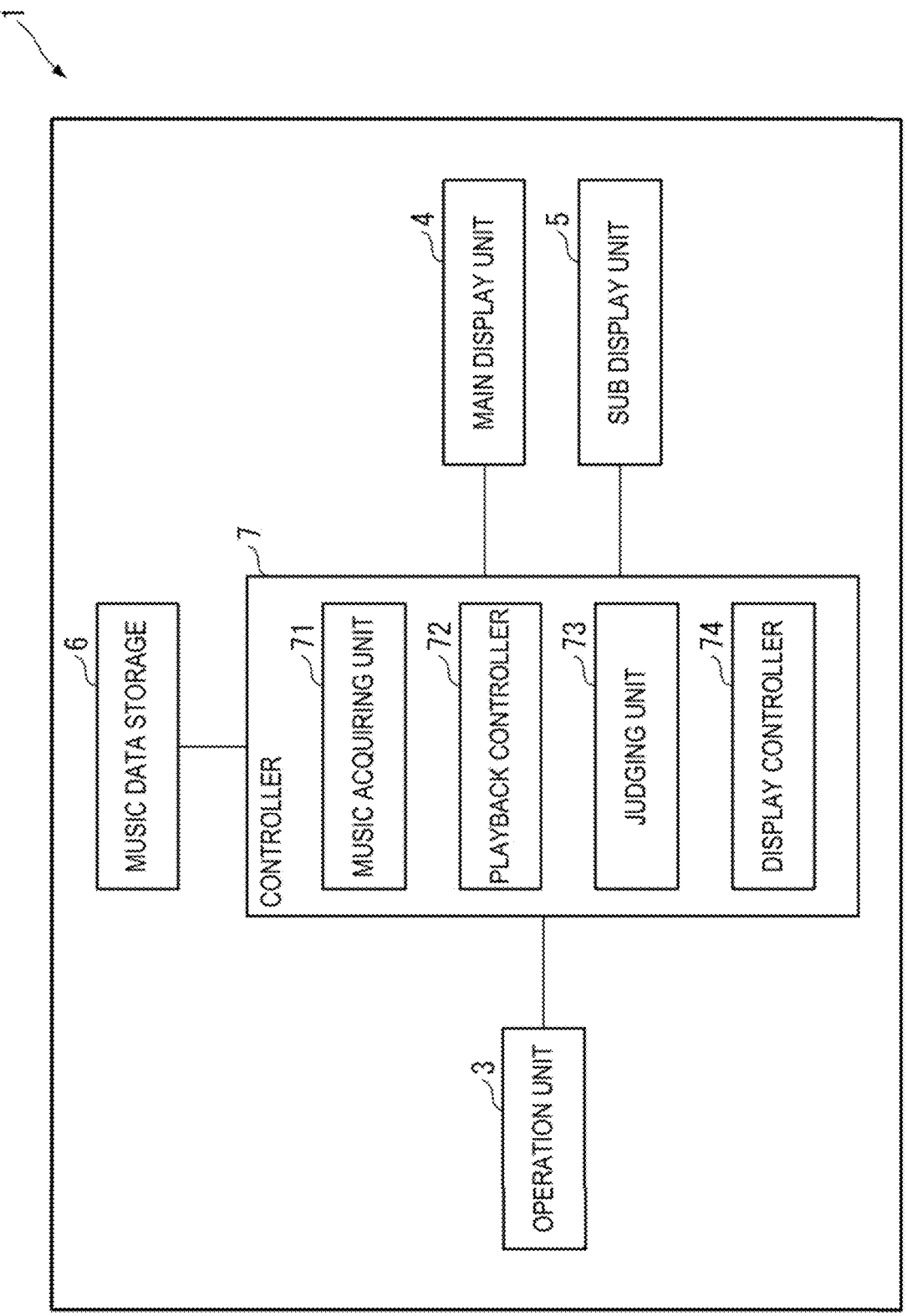
FIG. 2 is a block diagram showing functions of the acoustic device according to the exemplary embodiment.

FIG. 2 is a block diagram showing functions of the acoustic device 1.

The acoustic device 1 includes a music data storage 6 and the controller 7 as shown in FIG. 2, in addition to the above-described casing 2, operation unit 3, main display unit 4, and sub display unit 5.

Structure of Music Data Storage

The music data storage 6, which is provided by an HDD (Hard Disk Drive), SSD (Solid State Drive), flash memory, or the like, is capable of storing the music data. Specifically, the music data storage 6 stores a plurality of music data in a predetermined format (e.g. MPEG format). The music data includes audio information as well as tag information such as BPM, art work, title, artist name, album name, key, DJ play number, and genre of the music.

It should be noted that the acoustic device 1 optionally includes a communication interface, through which music data stored in an external storage (e.g. a semiconductor memory), a computer or the like is imported and stored in the music data storage 6. Alternatively, the external storage is optionally used as the music data storage 6. Further, the acoustic device 1 may include a playback device (e.g., CD (Compact Disc) player) as the music data storage 6 and may play the music data stored in an inserted CD or the like, using the playback device.

Structure of Controller

The controller 7 is implemented in the acoustic device 1 in a form of, for instance, a communication interface, a processor (e.g. CPU (Central Processing Unit)), and a memory providing a working area, and controls the operation of the acoustic device 1. The controller 7 includes a music acquiring unit 71, a playback controller 72, a judging unit 73, and a display controller 74, which are implemented by the processor that works in accordance with a program stored in the memory or received through the communication interface.

The functions of the above components will be further described below.

The music acquiring unit 71 is configured to acquire the music data from the music data storage 6 in response to a users operation on the operation unit 3, specifically, user's operation on the touch panel 33. The music data acquired by the music acquiring unit 71 is supplied to the playback controller 72 and the display controller 74.

The playback controller 72 is configured to play and output the music data acquired by the music acquiring unit 71 to a speaker or the like (not shown). At this time, the playback controller 72 performs special playback process (e.g. effect-applying process) as the playback control process on the currently played music data upon a user's special operation through the operation unit 3 (e.g. an operation relating to the effect processing).

The judging unit 73 is configured to judge the user's operation on the operation unit 3. Examples of the user's operation to be judged by the judging unit 73 include the playback control such as music playback operation and special playback on the decks 31 and the mixer 32, and a track selection operation on the touch panel 33 for selecting the music to be played.

The judging unit 73 detects which and how one(s) of the components of the operation unit 3 is operated. For instance, when detecting that the jog dial 311 of the deck 31 is rotated by a user, the judging unit 73 judges that an operation relating to the playback control on the currently played music data is performed. Alternatively, for instance, when detecting that an effect processing is selected by the effect selector knob 321 of the mixer 32, the judging unit 73 judges that an operation relating to the above-described playback control is performed. Further alternatively, for instance, when detecting that a predetermined operation is performed on the touch panel 33, the judging unit 73 judges that the track selection operation is performed.

The judging unit 73 thus determines the user's operation on the operation unit 3. The results of the judgement made by the judging unit 73 are outputted to the display controller 74 to be used for controlling the display contents of the main display unit 4 and the sub display unit 5 by the display controller 74.

The display controller 74 controls the display contents of the main display unit 4 and the sub display unit 5.

Specifically, the display controller 74 generates the display screen to be displayed on each of the main display unit 4 and the sub display unit 5 according to the judgement results by the judging unit 73.

The display controller 74 outputs an image data for showing the display screen for the main display unit 4 to the main display unit 4 and an image data for showing the display screen for the sub display unit 5 to the sub display unit 5.

In other words, the display controller 74 serves as an image generator for generating the image data for various screens (e.g. the playback screen and selection screen) and an image output unit for outputting the generated image data to the main display unit 4 and the sub display unit 5.

The display control processing to be executed by the display controller 74 will be detailed below.

Normal Display Control Processing

Figure 3:
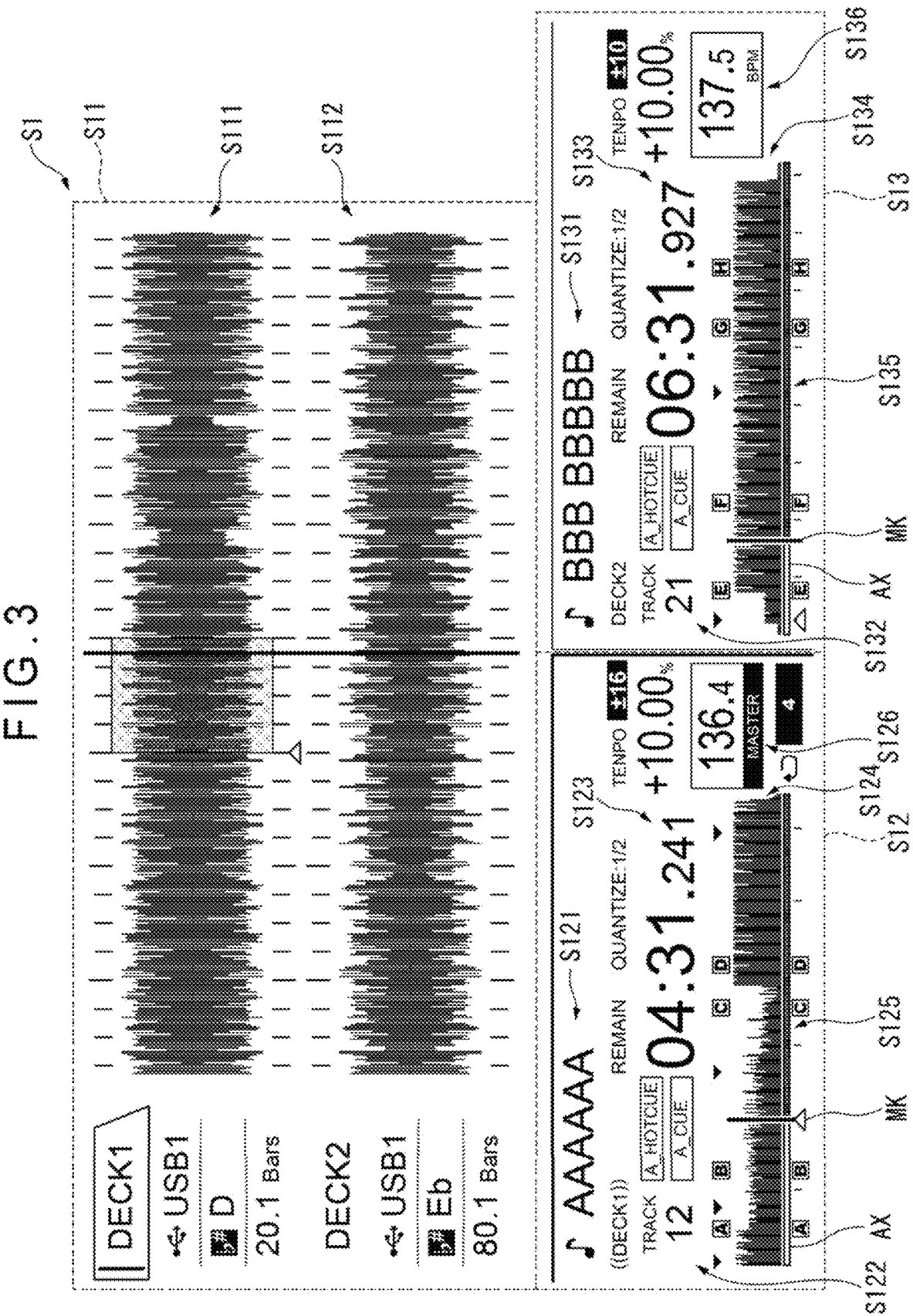
FIG. 3 illustrates the example of a display screen of a main display unit according to an exemplary embodiment.
Figure 4:
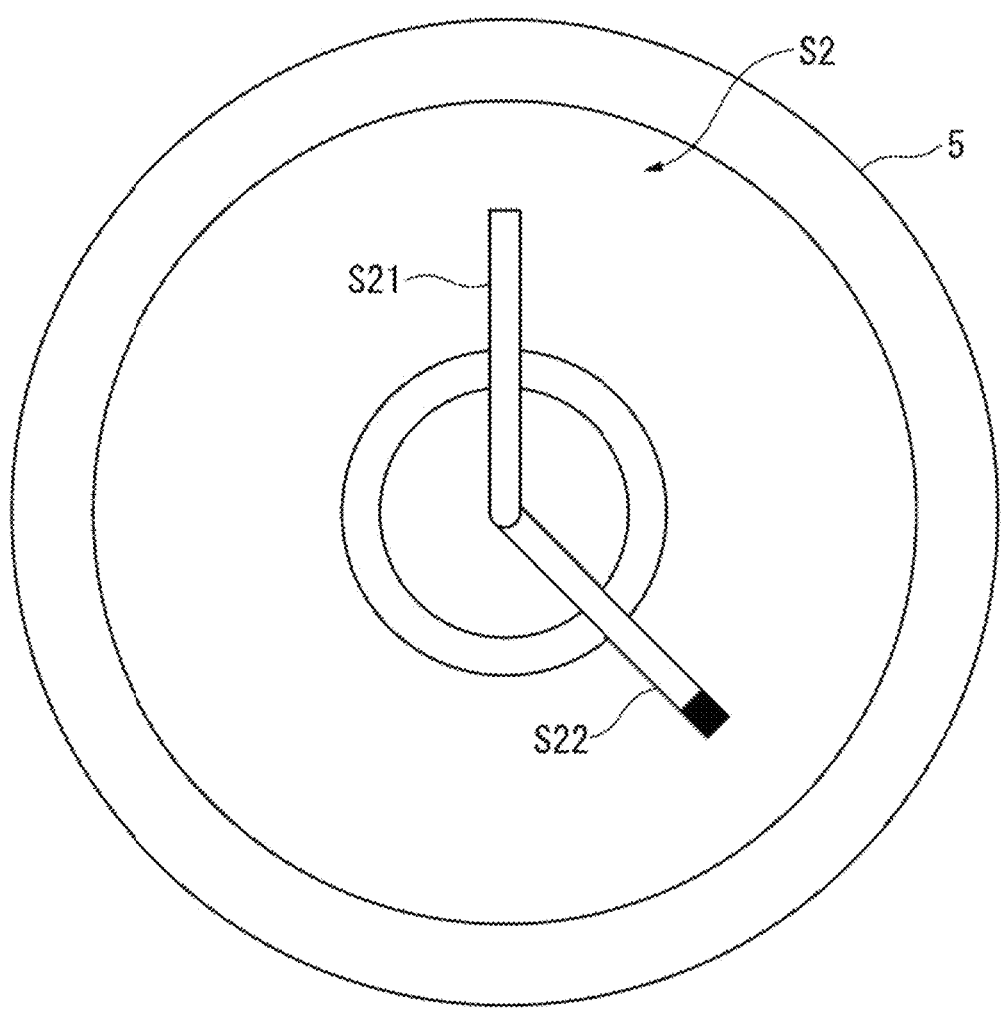
FIG. 4 illustrates an example of a display screen of a sub display unit according to the exemplary embodiment.

FIG. 3 illustrates an example of a first playback screen S1. FIG. 4 illustrates an example of a second playback screen S2.

Usually, the display controller 74 displays the first playback screen S1 such as exemplarily shown in FIG. 3 on the main display unit 4 (first display unit) and the second playback screen 32 such as exemplarily shown in FIG. 4 on the sub display unit 5 (second display unit). The first playback screen 31 and the second playback screen S2 are screens displayed on the main display unit 4 and the sub display unit 5, respectively, by the playback controller 72 usually while the music data is played. Specifically, the first playback screen S1 and the second playback screen S2 are screens displayed on the main display unit 4 and the sub display unit 5, respectively, while the track selection operation is not performed.

Arrangement of First Playback Screen

In the example shown in FIG. 3, two kinds of waveform information S111 and S112 of the music data currently played on the respective two decks 31 are displayed in an area S11 located at an upper side of the first playback screen S1. Specifically, assuming that the left deck 31 and the right deck 31 are referred to as "DECK1" and "DECK2," respectively, upper waveform information S111 and lower waveform information S112 respectively indicate waveform information of the music data loaded in the left deck 31 and waveform information of the music data loaded in the right deck 31. It should be noted that the two kinds of waveform information S111, 3112 each show an enlarged pattern of the waveform information within a predetermined time period, which includes the current playback position of the waveform information of the corresponding music data.

An area S12 showing information on the music data currently played and loaded in the left deck 31 is provided at a lower left side of the first playback screen S1. The area S12 includes a title display area S121, a number display area S122, a time display area S123, an entire waveform display area S124, a playback position display area S125, and a BPM display area S126.

The title of the currently played music data is displayed in the title display area S121.

A track number of the currently played music data is displayed in the number display area S122.

A playback elapsed time or a playback remaining time of the currently played music data is displayed in the time display area S123. The time display area S123 shows the playback remaining time in the example shown in FIG. 3, however, shows the playback elapsed time when a predetermined operation is performed on the operation unit 3. The playback elapsed time and the playback remaining time are collectively referred to as the playback time information.

Waveform information of the entirety of the currently played music data is displayed in the entire waveform display area S124. The playback position display area S125 has a marker MK that slides along an axis AX provided at a lower side of the entire waveform display area S124 according to the playback time of the music data. Accordingly, a user can see the current playback position of the music by checking the position of the marker MK on the axis AX, which shows the current position of the playback time of the music data. In addition, the user can roughly recognize how long the playback time is and how much playback time is left. In other words, the axis AX and the marker MK displayed in the playback position display area S125 are symbols showing the playback time information. It should be noted that alphabets showing the cue positions in the entire playback time of the music data are assigned to the entire waveform display area S124 and the axis AX in the example shown in FIG. 3.

BPM of the currently played music data is displayed in the BPM display area S126.

An area S13 showing information on the music data currently played and loaded in the right deck 31 is provided on a lower right side of the first playback screen S1. The area S13 includes a title display area S131, a number display area S132, a time display area S133, an entire waveform display area S134, a playback position display area S135, and a BPM display area S136.

It should be noted that, since the display contents in the display areas S131 to S136 of the area S13 are respectively similar to those in the display areas S121 to S126 of the area S12, the description of the display contents in the display areas S131 to S136 of the area S13 is omitted.

Arrangement of Second Playback Screen

In the example shown in FIG. 4, the second playback screen S2 includes a first hand S21 and a second hand S22.

In the second playback screen S2 displayed in the left sub display unit 5, the first hand S21 rotates clockwise in synchronization with a rotation speed (e.g., 33 RPM for LP record) of an analog record according to the playback state of the music data on the basis of beat position information of the music data loaded in the left deck 31. When the jog dial 311 of the left deck 31 is rotated by a user, the rotation direction and rotation speed of the first hand S21 are adjusted according to the rotation direction and rotation speed of the jog dial 311.

The second hand 322 is an indicator showing the function selected by a user.

It should be noted that, though not illustrated, the second playback screen S2 shown in the right sub display unit 5 also includes the first hand 321 and the second hand S22. Among the above, the first hand S21 rotates clockwise in synchronization with the rotation speed (e.g., 33 RPM for LP record) of an analog record according to the playback state of the music data on the basis of the beat position information of the music data loaded in the right deck 31.

Display Control Processing at the Time of Track Selection Operation

Figure 5:
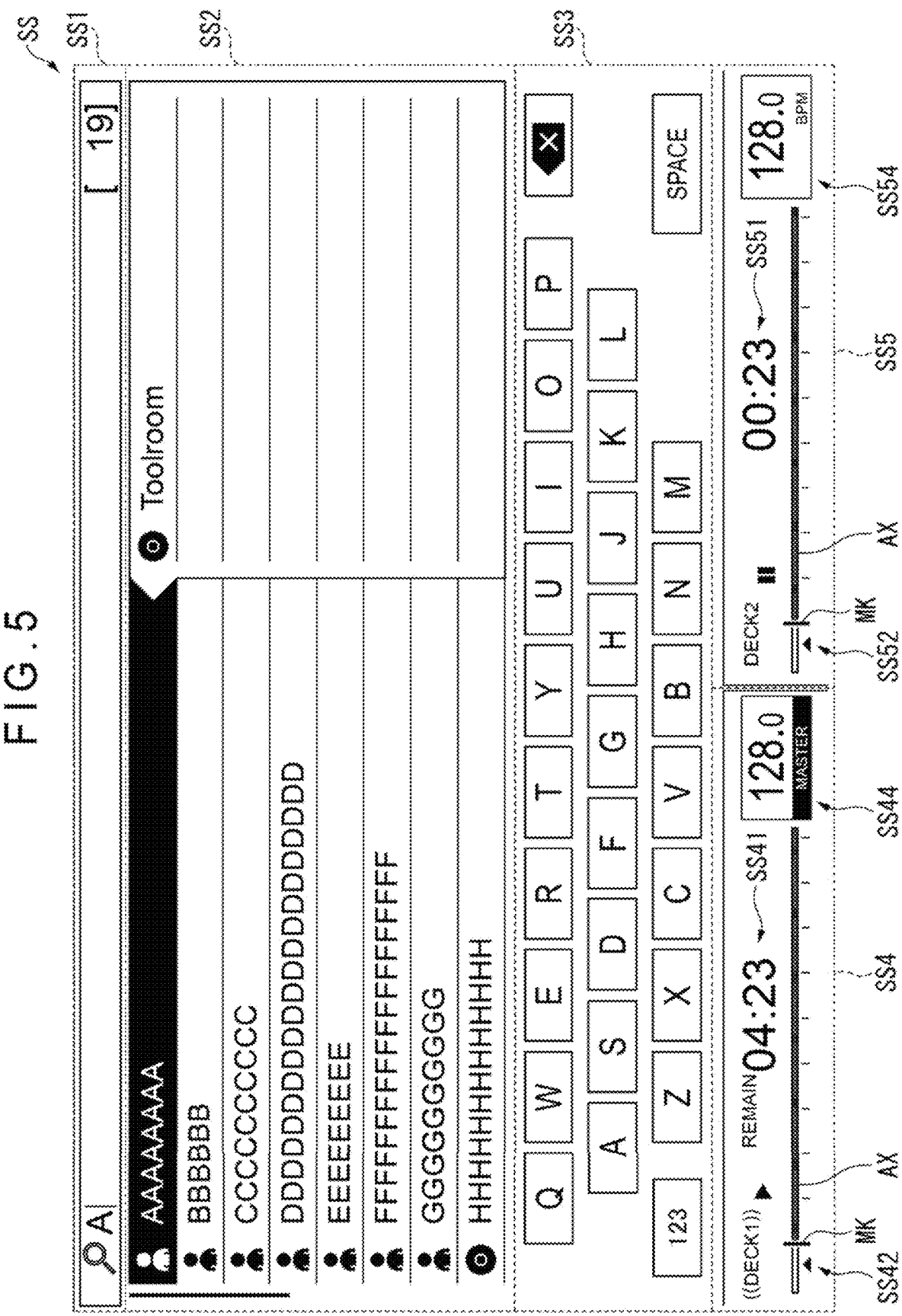
FIG. 5 illustrates another example of the display screen of the main display unit according to the exemplary embodiment.
Figure 6:
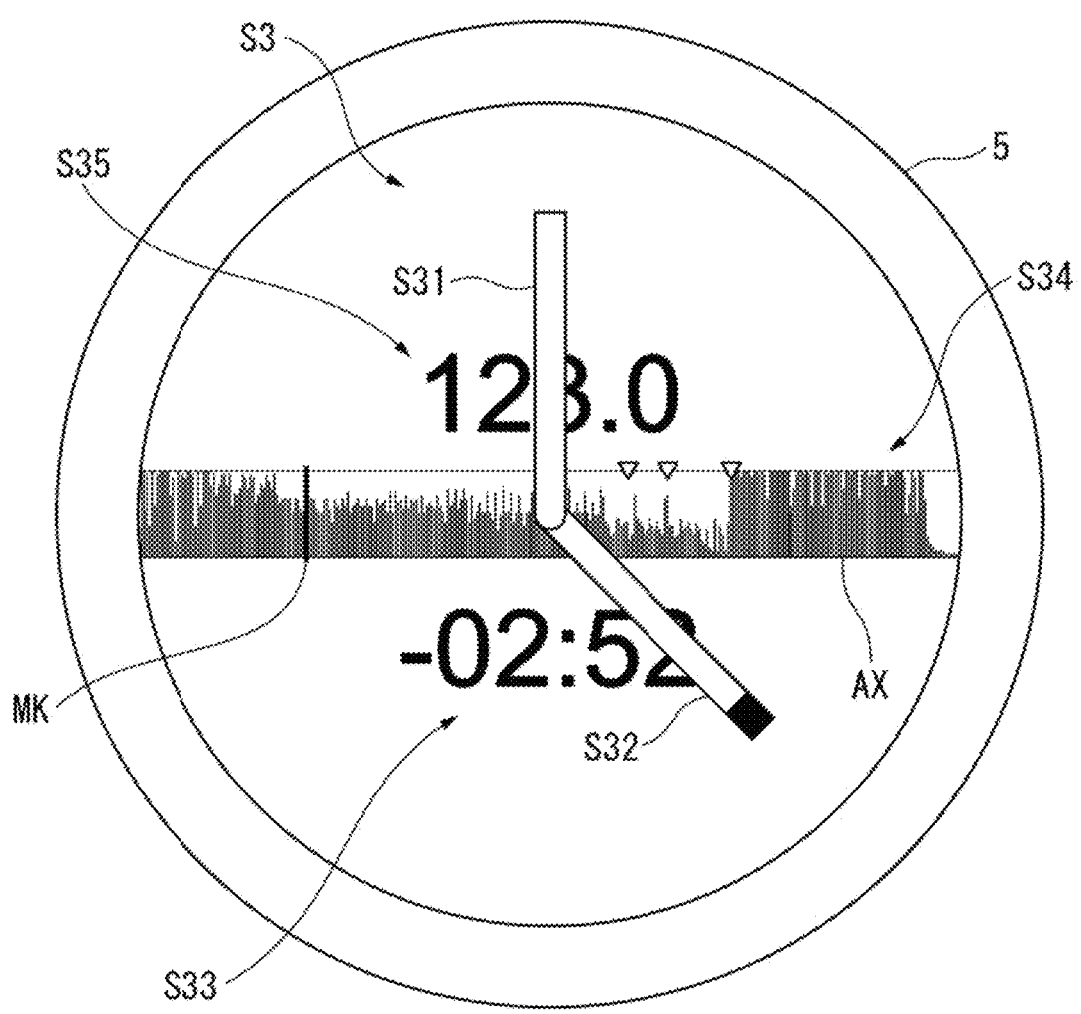
FIG. 6 illustrates another example of the display screen of the sub display unit according to the exemplary embodiment.

FIG. 5 illustrates an example of a track selection screen SS. FIG. 6 illustrates an example of a third playback screen S3.

When the judging unit 73 judges that a track selection operation is performed, the display controller 74 displays the track selection screen SS (an example of which is shown in FIG. 5) and the third playback screen 33 (an example of which is shown in FIG. 6) on the main display unit 4 (first display unit) and the sub display unit 5 (second display unit), respectively. The track selection screen SS and the third playback screen S3 are screens displayed on the main display unit 4 and the sub display unit 5, respectively, when the judging unit 73 judges that the track selection operation is performed.

Arrangement of Track Selection Screen

In the example shown in FIG. 5, a search bar for performing keyword (e.g. artwork, title, artist name, and album name) search is displayed in an area SS1 located at the uppermost part of the track selection screen SS.

An area SS2 for displaying a track list of an artist or an album is provided below the area SS1 in the track selection screen SS.

An area SS3 for displaying character input keys used for the above-described keyword search is provided below the area SS2 in the track selection screen SS.

An area SS4 showing information on the music data loaded in the left deck 31 and currently played and is provided at a lower left side of the track selection screen SS. The area SS4 includes a time display area SS41, a playback position display area SS42, a marker MK and a BPM display area S544.

The time display area SS41 displays a playback elapsed time or a playback remaining time of the currently played music data. The time display area SS41 shows the playback remaining time in the example shown in FIG. 5, however, the time display area S123 shows the playback elapsed time when a predetermined operation is performed on the operation unit 3. The playback elapsed time and the playback remaining time are collectively referred to as the playback time information.

The playback position display area SS42 is an area in which the marker MK slides along the axis AX in accordance the elapsed playback time of the music data, where a display format of the axis AX differs on both sides of the marker MK. Accordingly, a user can see the current playback position of the music by checking the position of the marker MK, which shows the current position of the playback time of the music data, on the axis AX. In addition, the user can roughly recognize how long the playback time is and how much playback time is left. In other words, the axis AX and the marker MK displayed in the playback position display area SS42 are symbols showing the playback time information.

BPM of the currently played music data is displayed in the BPM display area S344.

An area SS5 showing information on the music data loaded in the right deck 31 and currently played is provided at a lower right side of the track selection screen SS. The area SS5 includes a time display area SS51, a playback position display area SS52, a marker MK and a BPM display area SS54.

It should be noted that, since the display contents in the display areas SS51, SS52, and SS54 of the area SS5 are respectively similar to those in the display areas SS41, SS42, and SS44 of the area SS4, the description of the display contents in the display areas SS51, SS52, and SS54 of the area SS5 is omitted. However, the playback elapsed time is displayed instead of the playback remaining time in the time display area SS51 in the example shown in FIG. 5. When a predetermined operation is performed on the operation unit 3, the playback remaining time is displayed in the time display area SS51.

Arrangement of Third Playback Screen

In the example shown in FIG. 6, the third playback screen S3 includes a first hand S31, a second hand S32, a time display area S33, an entire waveform display area 334, a marker MK, and a BPM display area S35.

Displayed contents of the first hand S31 and the second hand 332 are similar to the first hand S21 and the second hand 322 in the above-described second playback screen S2.

A playback elapsed time or a playback remaining time of the currently played music data is displayed in the time display area S33. The time display area S33 shows the playback remaining time in the example shown in FIG. 6, however, shows the playback elapsed time when a predetermined operation is performed on the operation unit 3. The playback elapsed time and the playback remaining time are collectively referred to as the playback time information. The playback remaining time and the playback elapsed time in the time display area S33 are optionally switched in synchronization with or, alternatively, independently of the switching of the playback remaining time and the playback elapsed time in the time display areas SS41 and SS51 in the above-described track selection screen SS.

Waveform information of the entirety of the currently played music data is displayed in the entire waveform display area S34. The marker MK showing the current playback position in the entirety of the music data is displayed in the entire waveform display area S34. The marker MK horizontally slides according to the playback elapsed time of the music data.

BPM of the currently played music data is displayed in the BPM display area S35.

Though not illustrated, the third playback screen 33 displayed in the right sub display unit 5 also includes the first hand 331, the second hand S32, the time display area S33, the entire waveform display area S34, the marker MK, and the BPM display area S35.

Among the above, the first hand 331 rotates clockwise in synchronization with the rotation speed (e.g., 33 RPM for LP record) of an analog record according to the playback state of the music data on the basis of the beat position information of the music data loaded in the right deck 31. The display contents of the second hand 332 and the display area S33 to S35 are similar to the display contents of the corresponding display areas in the third playback screen S3 displayed on the left sub display unit 5.

Operation Control Processing

Figure 7:
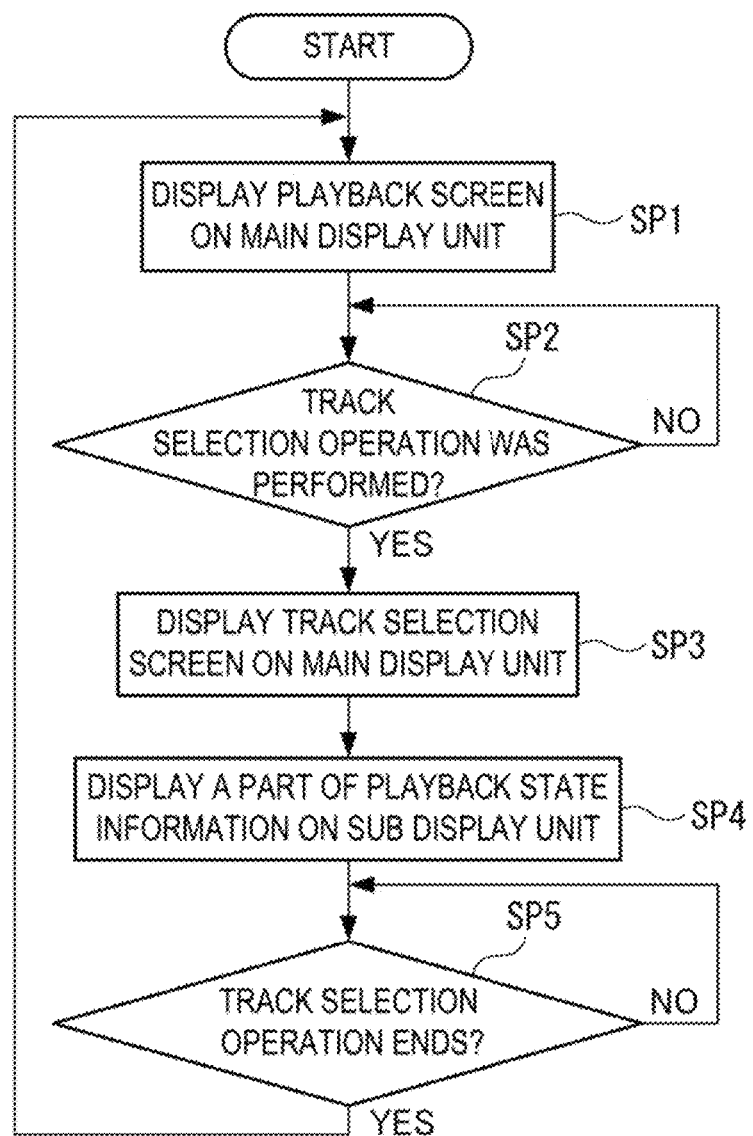
FIG. 7 is a flowchart showing an operation control processing according to the exemplary embodiment.

FIG. 7 is a flowchart showing an operation control processing to be executed by the controller 7.

The operation control processing to be executed by the controller 7 will be described below with reference to the flowchart shown in FIG. 7.

The controller 7 executes the operation control processing described below by reading and running an operation control program from a storage or storing medium (not shown). The operation control processing includes a display control processing corresponding to the display control method of the invention.

In the operation control processing, the display controller 74 initially displays the first playback screen S1 and the second playback screen S2 on the main display unit 4 and the sub display unit 5, respectively (step SP1).

Next, the judging unit 73 judges whether the track selection operation is performed through the operation unit 3 (step SP2).

When the judging unit 73 does not judge that the track selection operation is performed in step SP2 (step SP2: NO) (i.e. when it is judged that the track selection operation is not performed), the controller 7 repeats step SP2. The first playback screen S1 and the second playback screen S2 displayed in step SP1 are thus kept being displayed.

In contrast, when the judging unit 73 judges that the track selection operation is performed in step SP2 (step SP2: YES), the display controller 74 displays the track selection screen on the main display unit 4 (step SP3).

In addition, the display controller 74 displays, on the sub display unit 5, a part of the playback state information that has been displayed on the main display unit 4 (step SP4). Specifically, in step SP4, the display controller 74 displays, on the sub display unit 5, the third playback screen S3 including a part of the playback state information that has been displayed on the main display unit 4.

Next, the judging unit 73 judges whether the track selection operation by the user ends (step SP5).

When the judging unit 73 does not judge that the track selection operation ends in step SP5 (step SP5: NO) (i.e. when it is judged that the track selection operation does not end), the controller 7 repeats step SP5. The track selection screen SS and the third playback screen S3 displayed in steps SP3 and SP4 are thus kept being displayed.

In contrast, when the judging unit 73 judges that the track selection operation ends in step SP5 (step SP5: YES), the process is returned to step SP1 by the controller 7. The display controller 74 thus displays the first playback screen S1 and the second playback screen S2 on the main display unit 4 and the sub display unit 5, respectively.

Advantage(s) of Exemplary Embodiment

The following advantages can be achieved by the acoustic device 1 according to the above-described present exemplary embodiment.

The acoustic device 1 includes the main display unit 4, the sub display unit 5, the operation unit 3 configured to receive the user's operation, the judging unit 73 configured to judge the type of operation on the operation unit 3, and the display controller 74. In response to the operation type determined by the judging unit 73, the display controller 74 changes the display contents of the main display unit 4 to the display contents corresponding to the operation type and displays on the sub display unit 5 at least a part of the display contents having been displayed on the main display unit 4.

According to the above arrangement, a user can visually recognize the display contents, which relates to the operation to be performed by the user, by seeing the main display unit 4 and visually recognize at least a part of the display contents having been displayed on the main display unit 4 by seeing the sub display unit 5. This display contents of the main display unit 4 and the sub display unit 5 can be actively controlled in accordance with the user's operation, thereby displaying contents corresponding to a plurality of functions of the acoustic device 1. Accordingly, the contents suitable for other operation(s) by the user can be displayed in addition to the contents suitable for the user's request, thereby enhancing versatility of the acoustic device 1.

The playback controller 72 for controlling the playback of the music data is further provided. The display controller 74 displays the first playback screen S1 including the playback state information showing the playback state of the music data on the main display unit 4. When the judging unit 73 judges that the operation type is the track selection operation, the display controller 74 changes the display contents of the main display unit 4 from the first playback screen S1 to the track selection screen SS and displays the third playback screen S3, which includes at least a part of the playback state information, on the sub display unit 5.

According to the above arrangement, while performing the track selection operation by checking the track selection screen SS displayed on the main display unit 4, the user can recognize the playback state of the music data by checking at least a part of the playback state information displayed on the sub display unit 5. Accordingly, the playback state of the music data can be controlled while the track selection operation is performed.

The playback state information includes the playback time information including at least one of the playback elapsed time or the playback remaining time of the music data. The display controller 74 displays the third playback screen S3 including the playback time information on the sub display unit 5 when the judging unit 73 judges that the operation type is the track selection operation.

According to the above arrangement, even when a large part of the display area of the main display unit 4 is occupied by the track selection screen SS, the user can recognize the time until the end of the currently played music data by seeing the playback time information displayed on the sub display unit 5. In other words, the user can recognize the playback time information while performing the track selection operation. Accordingly, the user can recognize the time available for the selection of the next music data to be played, thereby facilitating the track selection operation during a period until the end of the playback of the music data.

The display controller 74 displays the playback time information in a form of the numerical value indicating the playback time information and symbols (i.e, the axis AX and marker MK) indicating the playback time information on the sub display unit 5.

According to the above arrangement, since the value indicating the playback time information (i.e. the numerical value indicating at least one of the playback elapsed time or the playback remaining time) is displayed, a user can accurately recognize the at least one of the times.

Further, since the symbols indicating the playback time information are displayed, the user can intuitively recognize at least one of the playback elapsed time or the playback remaining time.

The track selection screen SS includes a track list of the music data.

The above arrangement allows a user to easily perform the track selection operation.

The display controller 74 displays the first playback screen S1 on the main display unit 4 when the judging unit 73 judges that the track selection operation ends.

According to the above arrangement, the display contents of the main display unit 4 can be switched from the track selection screen SS to the first playback screen S1 simultaneously with the completion of the track selection operation. Accordingly, the operation relating to the playback state of the music data can be facilitated by restoring the again required first playback screen S1 in place of the track selection screen SS, which is no longer necessary after the completion of the track selection operation.

The casing 2 is provided with the main display unit 4, the sub display unit 5, and the operation unit 3. The operation unit 3 is provided with the jog dial 311 (i.e. a rotary operator) rotatably provided to the casing 2. The sub display unit 5 is fixed to the casing 2 in a manner overlapped with the jog dial 311.

According to the above arrangement, an operation by the jog dial 311 (e.g. scratching operation) can be performed. In addition, since the sub display unit 5 is overlapped with the jog dial 311, an increase in the size of the casing 2 is restrained as compared with an instance provided with the sub display unit 5 independent of the jog dial 311. Further, since the sub display unit 5 is fixed on the casing 2, it is less likely that the display contents of the sub display unit 5 are not easily recognized when the jog dial 311 is rotated.

Modification of Exemplary Embodiment

It should be noted that the invention is not limited to the above-described embodiments but includes modifications, improvements, and the like as long as an object of the invention can be achieved.

In the exemplary embodiment, in response to the operation type determined by the judging unit 73, the display controller 74 changes the display contents of the main display unit 4 to the display contents corresponding to the operation type and displays on the sub display unit 5 at least a part of the display contents that have been displayed on the main display unit 4. However, the display controller 74 optionally displays all of the display contents having been displayed on the main display unit 4 on the sub display unit 5.

Further, in the exemplary embodiment, the display contents of the main display unit 4 (the first display unit) and the display contents of the sub display unit 5 (the second display unit) are switched when it is judged that the user's operation in a form of the track selection operation is performed. However, the display contents of the main display unit 4 and the display contents of the sub display unit 5 are optionally switched when it is judged that a setting operation on the acoustic device 1 or an operation for displaying a menu screen is performed. In other words, the user's operation for displaying the display contents having been displayed on the main display unit 4 on the sub display unit 5 is changeable as necessary.

In the exemplary embodiment: the display controller 74 displays the first playback screen S1 including the playback state information showing the playback state of the music data on the main display unit 4; and, when the judging unit 73 judges that the operation type is the track selection operation, the display controller 74 changes the display contents of the main display unit 4 from the first playback screen S1 to the track selection screen SS and displays the third playback screen S3, which includes at least a part of the playback state information, on the sub display unit 5. However, the display controller 74 optionally displays, on the sub display unit 5, a screen including all of the display contents having been displayed on the main display unit 4.

In the exemplary embodiment, the playback state information includes the playback time information including at least one of the playback elapsed time or the playback remaining time of the music data. However, the playback state information optionally includes information other than the playback time information. Alternatively, the playback time information optionally includes only one of the playback elapsed time and the playback remaining time of the music data. Further alternatively, the playback elapsed time and the playback remaining time are optionally simultaneously displayed on the same screen. Further, in place of the playback time information, other time information (e.g. the playback time of the entire music data) is optionally displayed.

In the exemplary embodiment, a numerical value indicating the playback time information and symbols indicating the playback time information are displayed on the sub display unit 5. However, as an alternative, only one of the numerical value indicating the playback time information and the symbol(s) indicating the playback time information is optionally displayed or none of the numerical value and the symbol(s) are optionally displayed. Additionally, the playback time information optionally includes information other than the numerical value and the symbol(s) indicating the playback time information.

In the exemplary embodiment, the track selection screen SS includes a track list of the music data. However, the track selection screen SS optionally does not include the track list of the music data.

In the exemplary embodiment, when the judging unit 73 judges that the operation type is the track selection operation, the display contents of the main display unit 4 is changed from the first playback screen S1 to the track selection screen SS and the third playback screen S3, which includes at least a part of the playback state information, is displayed on the sub display unit 5. However, the display contents of the main display unit 4 and the sub display unit 5 are optionally controlled based on judgement of an operation other than the track selection operation. For instance, a setting operation on the acoustic device 1 itself is optionally judged and, when a user performs the setting operation using the main display unit 4, the third playback screen S3 including at least a part of the playback state information is optionally displayed on the sub display unit 5.

In the exemplary embodiment, the acoustic device 1 includes total three display units that are the main display unit 4 and the two sub display units 5. However, the acoustic device 1 optionally includes two display units or four or more display units, the number of which is changeable as necessary.

The sub display unit 5 in the exemplary embodiment is fixed to the casing 2 in a manner overlapping with the jog dial 311. However, the sub display unit 5 is optionally provided at a position different from the jog dial 311 on the casing 2.

It should be noted that the acoustic device of the invention encompasses not only the acoustic device including integrated media player and mixer for controlling the media player as in the exemplary embodiment but also a sound playback device for playing the music data, a sound playback control device for controlling the sound playback device, a so-called DJ controller not provided with a sound playback function, and the like.

The controller 7 of the acoustic device 1 in the exemplary embodiment executes the above-described operation control processing by reading and running the operation control program from the storage or the storing medium (not shown). However, the controller 7 is not necessarily configured as in the exemplary embodiment but is optionally configured to import and run the operation control program from, for instance, a device(s) in a network. It should be noted that examples of the storage medium include a disk storage medium, an HDD, and a semiconductor memory.

1 ... acoustic device, 2 ... casing, 3 ... operation unit, 4 ... main display unit (first display unit), 5 ... sub display unit (second display unit), 6 ... music data storage, 7 ... controller, 71 ... music acquiring unit, 72 ... playback controller, 73 ... judging unit, 74 ... display controller

The invention claimed is:

1. An acoustic device comprising:
a first display unit;
a second display unit;
an operation unit configured to receive a user's operation;
a judging unit configured to judge a type of the operation on the operation unit; and
a display controller configured to, in response to the type of the operation judged by the judging unit, change display contents of the first display unit to display contents corresponding to the type of the operation and display on the second display unit at least a part of the display contents having been displayed on the first display unit,
wherein when the judging unit judges that the type of the operation is a track selection operation,
the display controller changes the display contents of the first display unit by displaying on the first display unit a track selection screen relating to the track selection operation and playback time information comprising at least one of a playback elapsed time or a playback remaining time of the music data among playback state information indicating a playback state of music data, and
the display controller displays on the second display unit at least waveform information of the music data among the playback state information, the waveform information of the music data is included in the display contents having been displayed on the first display unit.

2. The acoustic device according to claim 1, wherein the display controller displays the playback time information on the second display unit when the judging unit judges that the type of the operation is the track selection operation.

3. The acoustic device according to claim 2, wherein the display controller displays on the second display unit, as the playback time information, at least one of a numerical value indicating the playback time information or a symbol indicating the playback time information.

4. The acoustic device according to claim 1, wherein the track selection screen comprises a track list of the music data.

5. The acoustic device according to claim 1, wherein the display controller displays the playback screen on the first display unit when the judging unit judges that the track selection operation ends.

6. The acoustic device according to claim 1, further comprising:
a casing provided with the first display unit, the second display unit, and the operation unit, wherein
the operation unit comprises a rotary operator rotatably provided to the casing, and
the second display unit is fixed to the casing in a manner overlapping with the rotary operator.

7. The acoustic device according to claim 1, wherein the display controller is configured to:
display a playback screen comprising the playback state information on the playback state of the music data on the first display unit, the playback state information comprising the playback time information and the waveform information; and
when the judging unit judges that the type of the operation is the track selection operation, change the display contents of the first display unit from the playback screen to display the track selection screen relating to the track selection operation and the playback time information.

8. The acoustic device according to claim 7, wherein the display controller is configured to change the display contents of the first display unit from displaying the track selection screen and the playback time information to the playback screen when the judging unit judges that the track selection operation ends.

9. A display control method performed using an acoustic device comprising a first display unit, a second display unit, and an operation unit, the method comprising:
judging a type of an operation performed on the operation unit; and
in response to the judged type of the operation, changing display contents of the first display unit to display contents corresponding to the type of the operation and displaying on the second display unit at least a part of the display contents having been displayed on the first display unit,
wherein when the type of the operation is judged as a track selection operation,
changing the display contents of the first display unit by displaying on the first display unit a track selection screen relating to the track selection operation and playback time information comprising at least one of a playback elapsed time or a playback remaining time of the music data among playback state information indicating a playback state of music data, and
displaying on the second display unit at least waveform information of the music data among the playback state information, the waveform information of the music data is included in the display contents having been displayed on the first display unit.

10. The display control method according to claim 9, further comprising:
before judging the type of the operation performed on the operation unit, having the first display unit display a playback screen comprising the playback state information on the playback state of the music data on the first display unit, the playback state information comprising the playback time information and the waveform information, and
when the type of the operation is judged as the track selection operation, changing the display contents of the first display unit from the playback screen to display the track selection screen relating to the track selection operation and the playback time information.

11. The display control method according to claim 10, further comprising:

when it is judged that the track selection operation ends, changing the display contents of the first display unit from displaying the track selection screen and the playback time information to the playback screen.

12. A non-transitory computer-readable recording medium recording thereon a display control program performed using an acoustic device comprising a first display unit, a second display unit, and an operation unit, the display control program being configured to make the acoustic device perform:

judging a type of an operation on the operation unit; and in response to the judged type of the operation, changing display contents of the first display unit to display contents corresponding to the type of the operation and displaying on the second display unit at least a part of the display contents having been displayed on the first display unit, wherein when the type of the operation is judged as a track selection operation, changing the display contents of the first display unit by displaying on the first display unit a track selection screen relating to the track selection operation and playback time information comprising at least one of a playback elapsed time or a playback remaining time of the music data among playback state information indicating a playback state of music data, and displaying on the second display unit at least waveform information of the music data among the playback state information, the waveform information of the music data is included in the display contents having been displayed on the first display unit.

13. The non-transitory computer-readable recording medium recording thereon a display control program according to claim 12, wherein the display control program is further configured to make the acoustic device perform:

before judging the type of the operation performed on the operation unit, having the first display unit display a playback screen comprising the playback state information on the playback state of the music data on the first display unit, the playback state information comprising the playback time information and the waveform information, and when the type of the operation is judged as the track selection operation, changing the display contents of the first display unit from the playback screen to display the track selection screen relating to the track selection operation and the playback time information.

14. The non-transitory computer-readable recording medium recording thereon a display control program according to claim 13, wherein when it is judged that the track selection operation ends, changing the display contents of the first display unit from displaying the track selection screen and the playback time information to the playback screen.

\* \* \* \* \*